(12) United States Patent
Annunziata

(10) Patent No.: US 8,096,863 B2
(45) Date of Patent: Jan. 17, 2012

(54) EMOTION-BASED GAME CHARACTER MANIPULATION

(75) Inventor: Ed Annunziata, Montara, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 597 days.

(21) Appl. No.: 12/288,613

(22) Filed: Oct. 21, 2008

(65) Prior Publication Data

US 2009/0082076 A1    Mar. 26, 2009

Related U.S. Application Data

(63) Continuation of application No. 10/364,972, filed on Feb. 11, 2003, now Pat. No. 7,452,268.

(60) Provisional application No. 60/401,879, filed on Aug. 7, 2002.

(51) Int. Cl.
    *G06F 17/00*  (2006.01)
(52) U.S. Cl. .......................................................... 463/1
(58) Field of Classification Search .................. 463/1–9, 463/23, 31, 32, 43
    See application file for complete search history.

(56) References Cited

U.S. PATENT DOCUMENTS

| | | | |
|---|---|---|---|
| 4,704,696 A | 11/1987 | Reimer et al. | |
| 4,738,451 A | 4/1988 | Logg | |
| 4,858,930 A | 8/1989 | Sato | |
| RE35,314 E | 8/1996 | Logg | |
| 6,009,458 A | 12/1999 | Hawkins et al. | |
| 6,159,100 A | 12/2000 | Smith | |
| 6,168,524 B1 | 1/2001 | Aoki et al. | |
| 6,270,402 B1 | 8/2001 | Fujoka et al. | |
| 6,273,818 B1 | 8/2001 | Komoto | |
| 6,347,993 B1 | 2/2002 | Kondo et al. | |
| 6,406,370 B1 | 6/2002 | Kumagai | |
| 6,508,706 B2 | 1/2003 | Sitrick et al. | |
| 6,530,834 B2 | 3/2003 | Kondo | |
| 6,561,811 B2 | 5/2003 | Rapoza et al. | |
| 6,579,176 B2 | 6/2003 | Wen et al. | |
| 6,599,196 B2 | 7/2003 | Kikukawa et al. | |
| 6,656,049 B1 | 12/2003 | Masaki et al. | |
| 6,676,514 B1 | 1/2004 | Kusuda et al. | |
| 6,679,774 B2 | 1/2004 | Fujioka et al. | |

(Continued)

FOREIGN PATENT DOCUMENTS

EP    0 898 237 A2    2/1999

(Continued)

OTHER PUBLICATIONS

Reynolds, Craig, "Interaction with Groups of Autonomous Characters," Proceedings of Game Developer Conference 2000, San Francisco, CA 2000.

(Continued)

*Primary Examiner* — Ronald Laneau
(74) *Attorney, Agent, or Firm* — Lewis and Roca LLP

(57) ABSTRACT

Methods and systems for emotion-based game character manipulation are provided. Each character is associated with a table of quantified attributes including emotional attributes and non-emotional attributes. An adjustment to an emotional attribute of a game character is determined based on an interaction with another game character. The emotional attribute of the first game character is adjusted, which further results in an adjustment to a non-emotional attribute of the first game character. The behavior of the first game character is then determined based on the adjusted non-emotional attribute.

20 Claims, 6 Drawing Sheets

U.S. PATENT DOCUMENTS

| | | | |
|---|---|---|---|
| 6,684,127 | B2 | 1/2004 | Fujita et al. |
| 6,722,973 | B2 | 4/2004 | Akaishi |
| 6,729,954 | B2 | 5/2004 | Atsumi et al. |
| 6,786,826 | B2 | 9/2004 | Himoto et al. |
| 6,881,148 | B2 | 4/2005 | Yotsugi et al. |
| 6,923,717 | B2 | 8/2005 | Mayer et al. |
| 6,935,954 | B2 | 8/2005 | Sterchi et al. |
| 7,033,275 | B1 | 4/2006 | Endo et al. |
| 7,339,589 | B2 | 3/2008 | Annunziata |
| 7,431,297 | B2 | 10/2008 | Kaji et al. |
| 7,502,759 | B2 | 3/2009 | Hannigan et al. |
| 7,806,758 | B2 * | 10/2010 | Van Luchene ............. 463/1 |
| 2001/0014619 | A1 | 8/2001 | Kusuda |
| 2002/0052238 | A1 | 5/2002 | Muroi |
| 2002/0082065 | A1 * | 6/2002 | Fogel et al. ............. 463/8 |
| 2004/0014527 | A1 | 1/2004 | Orr et al. |
| 2004/0029625 | A1 | 2/2004 | Annunziata |

FOREIGN PATENT DOCUMENTS

| | | |
|---|---|---|
| GB | 2365796 A1 | 2/2002 |
| JP | 11-119791 A | 4/1999 |
| JP | 2000-126451 A | 5/2000 |
| JP | 2001-79265 A | 3/2001 |
| JP | 2002-166048 A | 6/2002 |

OTHER PUBLICATIONS

Reynolds, Craig, "Flocks, Herds, and Schools: A Distributed Behavioral Model," Proceedings of SIGGRAPH '87, Computer Graphics 21(4), Jul. 1987.

Yu, Bin et al., "A Social Mechanism of Reputation Management in Electronic Communities," Proceedings of 4th International Workshop on Cooperative Information Agents, 2000.

Reynolds, Craig, "Steering Behaviors for Autonomous Characters," Proceedings of Game Developers Conference 1999.

"Sequence Paradium 2—Laughter in the Dark—Tactical Guidebook," First Edition, Keibunsha Inc., Feb. 10, 2005, pp. 5-32.

"Konami Official Guide Perfect Series, Tokimeki Memorial—Forever with You: Official Guide," First Edition, Konami Corporation, Jun. 29, 1997.

"LOGiN," vol. 21, No. 4, Enterbrain, Inc., Apr. 1, 2002, pp. 70-77.

"Arcadia," vol. 2, No. 12, Enterbrain, Inc., Dec. 1, 2001, pp. 56-63.

"Super Mario Brothers: Complete Cheat Book," Tokuma Publishing Co., Ltd., Nov. 20, 1985, p. 9.

Stewart, Nick, "The Adrenaline Vault Review of the Sims", Mar. 9, 2000, printed from the internet.

Simpson, Dan, "The Complete Sims Guide", Feb. 6, 2005, pertinent sections printed from the internet, may also be found in its entirity at http://www.neoseeker.com/resourcelink.html?rlid=16238 &rid=15516.

"The Sims", Oct. 14, 2005, pertinent section printed from the Internet, may also be found in its entirity at: http://pc.gamespy.com/pc/the-sims/.

Sprigg, Sean "Examiner's Affidavit," Oct. 17, 2005.

The Sims PC Game Manual pp. 1-92. Published by Electronic Arts as part of the original game. Copyright 2000.

http://www.gamespot.com/pc/strategy/sims/review.html?om__act=convert&om_clk=tabs; reviews Published Feb. 11, 2000. This is a gamespot game review of the Sims.

Virtual Babyz: Believable agents with Narrative Intelligence, Andrew Stern, Narrative Intelligence AAAI Symposium, Nov. 1999. www.babyz.net/features.html.

http://en.wikipedia.or.q/wiki/Babyz.

Examiner's Affidavit Feb. 4, 2000.

Northwestern University, CS395 Game Design Course "Simulation and Modeling: Under the hood of the Sims", Spring 2005.

The Complete Sims Guide (excerpt), Dan Simpson.

Affidavit by Colby B. Springer.

Stern, Andrew "Virtual Babyz: Believable Agents with Narrative Intelligence", Online View Apr. 28, 2006 http://www.cs.cmu.edu/afs/cs/user/michaelm/www/nidocs/Stern.html.

"Babyz Features Page", Online. Viewd May 3, 2006. http://www.babyz.net/featured.html.

"Babyz" Wikipedia online reference. View May 1, 2006 http://en.wikipedia.org/wiki/babyz.

"Simulation and Modeling: Under the hood of the Simes", Online viewd May 2, 2006 http://www.cs.norhtwestern.edu/%7Eforbus/c95-gd/lectures/The_Sims_Under_the_Hood_files/frame.htm.

Stern, Andrew "Andrew Stern" Online viewed Apr. 28,2006 http://quvu.net/andrew/resume.html Note highlighted section.

Brenesal. "Morrowind Review" PC Review at IGN. http://pc.ign.com/articles/359/359554p1.html (accessed Oct. 21, 2010).

Laird et al. "A Test Bed for Developing Intelligent Synthetic Characters." 2002 Spring Symposium Series: Artificial Intelligence and Interactive Entertainment [Online] 2002.

Paiva et al. "Heroes, Villains, Magicians, . . . : Dramatis Personae in a Virtual Story Creation Environment." Proceedings of the 6th international conference on Intelligent user interfaces [Online] 2001, pp. 129-136.

Pisanich et al. "Representing Human Characters in Interactive Games." Proceedings of the Computer Games Developer's Conference [Online] 1996.

Reynolds. "Interaction with groups of autonomous characters." Game Developers Conference [Online] 2000.

Shaw et al. "Creating Characters for Dynamic Stories in Interactive Games." International Conference on Application and Development of Computer Games Conference in 21st Century [Online] 2001.

U.S. Appl. No. 13/204,536, Ed Ammuziata, Emotion-Based Game Character Manipulation, filed Aug. 5, 2011

* cited by examiner

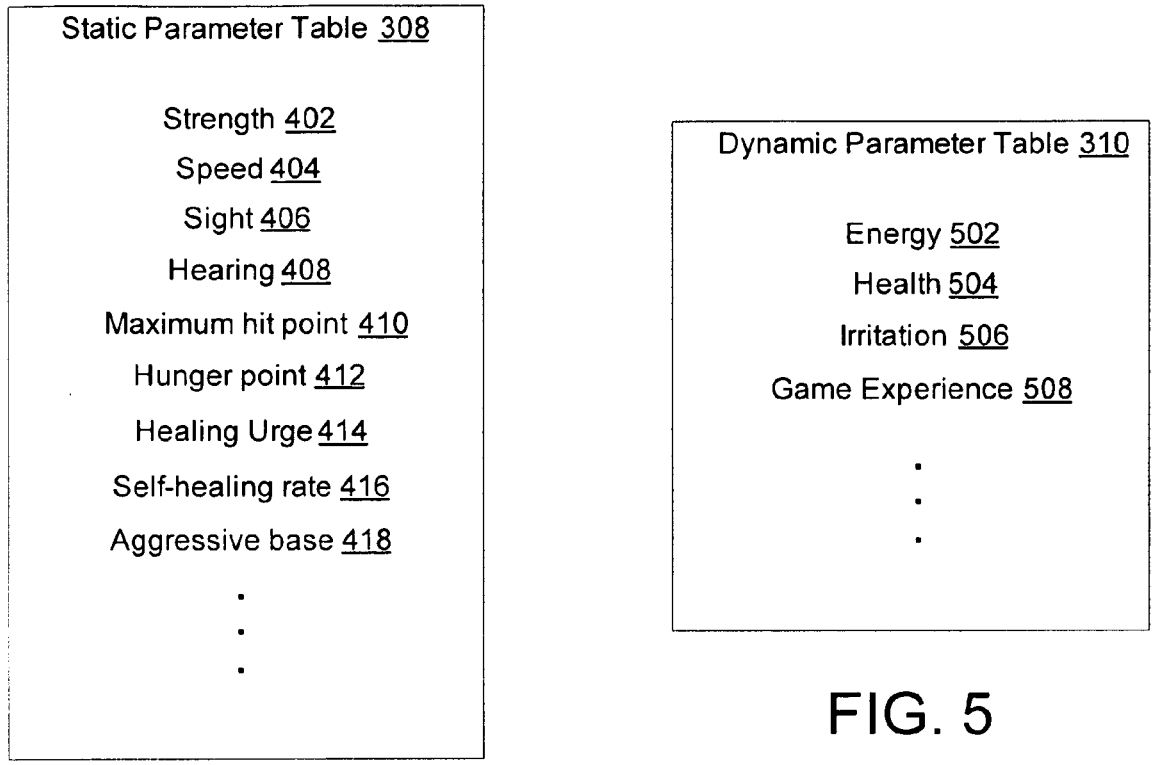
FIG. 4
FIG. 5
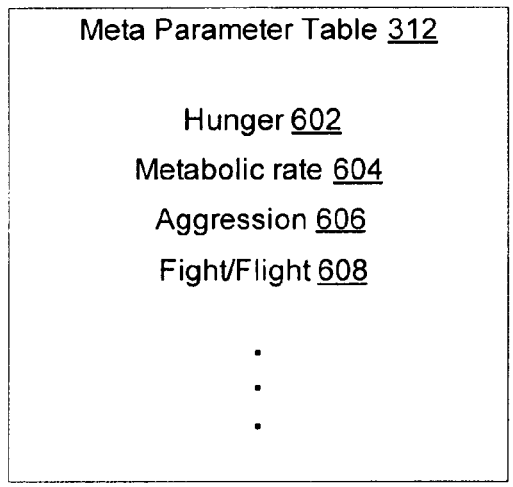
FIG. 6

Emotion Tables 314

Individuals H/L 702

| Character ID | Character H/L Value |
|---|---|
| 192993293 | -900 |
| 339399929 | -300 |
| 339399928 | 0100 |

Species H/L 704

| Species H/L Value | Species Name |
|---|---|
| 0100 | Nids |
| -500 | Antenids |
| 0300 | Zioids |
| 0100 | Trogids |
| 0880 | Phibians |

Team H/L 706

| Team ID | Team H/L Value | Team Name |
|---|---|---|
| 139000 | 1000 | Frosties |
| 239293 | -500 | Ferals |
| 300203 | -700 | Joeys |
| 939992 | -500 | Slashers |

FIG. 7

EMOTION-BASED GAME CHARACTER MANIPULATION

CROSS-REFERENCE TO RELATED APPLICATIONS

This application is a continuation and claims the priority benefit of U.S. patent application Ser. No. 10/364,972 filed Feb. 11, 2003 now U.S. Pat. No. 7,452,268, which claims the priority benefit of U.S. provisional patent application No. 60/401,879, filed Aug. 7, 2002, the disclosure of the aforementioned applications being incorporated herein by reference.

BACKGROUND OF THE INVENTION

1. Field of the Invention

This invention relates generally to electronic systems and more particularly to a system and method for training a group of characters to modify character behavior via group interactions.

2. Description of the Related Art

In electronic systems, particularly entertainment and gaming systems, a user typically controls the behavior or actions of at least one character in a game program using some type of manually activated controller device. Conventional controller devices include joysticks, switches, buttons, and keyboards. Further, some gaming systems use specifically designed control devices, such as a steering wheel and pedals for driving simulations, or a stick and pedals for flight simulations. Yet more advanced gaming systems may use voice controls or human movements in a virtual reality game.

In gaming systems using manually activated controller devices, a controller device, typically, utilizes buttons and keystrokes assigned with different meanings according to the requirements of the particular game. As an example, a game may have a particular button corresponding to a punch, while in another game the same button may correspond to firing a gun. In many games, a user can only control the actions of a single character. Although games may allow the user to control a group of characters, the characters typically act as a unit, so the group of characters effectively acts as a single character. Virtually all conventional games allow for manual user control of at least one character.

As game players become more sophisticated, the players are demanding more advanced forms of gaming. Early forms of electronic games consisted of simple blocks and moving targets (e.g., Breakout, Space Invaders, Centipede). Over time, the games became graphically more detailed and intricate. More recently, virtual reality games have become popular. Virtual reality games allow for the player to immerse themselves into the gaming environment and interact with various elements of the environment. However, all of these types of games require a large amount of manual control over character actions during the game play.

Furthermore, conventional games do not normally create any form of attachment or emotion between game characters and a human player. The game character is considered just an element of the game used for entertainment value. This lack of attachment or caring for the character is partly due to the perception that the character is not "alive." However, if the character projects life-like features and human characteristics, such as having feelings, the player is more likely to form an emotional attachment to the character.

In addition, users of conventional games do not typically utilize game character emotions as strategic game elements that may train or affect groups of characters via game play interactions. Emotions add a level of complexity and unpredictability to character behavior, and further add to a user's arsenal of strategic weapons to enhance game play enjoyment.

Therefore, there is a need for a system and method for dynamic modification of a character's actions based upon group interactions during game play.

SUMMARY OF THE INVENTION

Embodiments of the present invention provide methods and systems for emotion-based game character manipulation. Each character is associated with a table of quantified attributes including emotional attributes and non-emotional attributes. An adjustment to an emotional attribute of a game character is determined based on an interaction with another game character. The emotional attribute of the first game character is adjusted, which further results in an adjustment to a non-emotional attribute of the first game character. The behavior of the first game character is then determined based on the adjusted non-emotional attribute.

Various embodiments of the present invention include methods for emotion-based game character manipulation. Such methods may include maintaining a table of quantified attributes for a first game character, the attributes including emotional attributes and non-emotional attributes, determining an adjustment to an emotional attribute of the first game character based on an interaction between the first game character and a second game character, adjusting the emotional attribute of the first game character as determined, wherein adjustment of the emotional attribute results in an adjustment to a non-emotional attribute of the first game character, and generating a behavior of the first game character based on the adjusted non-emotional attribute.

Further embodiments include systems for emotion-based game character manipulation. Such systems may include a memory configured to store data concerning quantified attributes for a first game character, the attributes including emotional attributes and non-emotional attributes, a processor further configured to determine an adjustment to a stored emotional attribute of the first game character based on an interaction between the first game character and a second game character, a data table adjuster configured to adjust the stored emotional attribute of the first game character as determined by the processor, wherein adjustment of the stored emotional attribute results in an adjustment to a non-emotional attribute of the first game character and an action generator configured to generate a behavior of the first game character based on the adjusted non-emotional attribute.

Some embodiments of the present invention further include computer-readable storage media having embodied thereon programs executable by processors to perform methods for emotion-based game character manipulation.

BRIEF DESCRIPTION OF THE DRAWINGS

FIG. 4 is a block diagram of an exemplary embodiment of the static parameter table of FIG. 3, according to the present invention;

FIG. 5 is a block diagram of an exemplary embodiment of the dynamic parameter table of FIG. 3, according to the present invention;

FIG. 6 is a block diagram of an exemplary embodiment of the meta parameter table of FIG. 3, according to the present invention;

FIG. 7 is a block diagram of an exemplary embodiment of the emotion tables of FIG. 3, according to the present invention.

DETAILED DESCRIPTION

Figure 1:
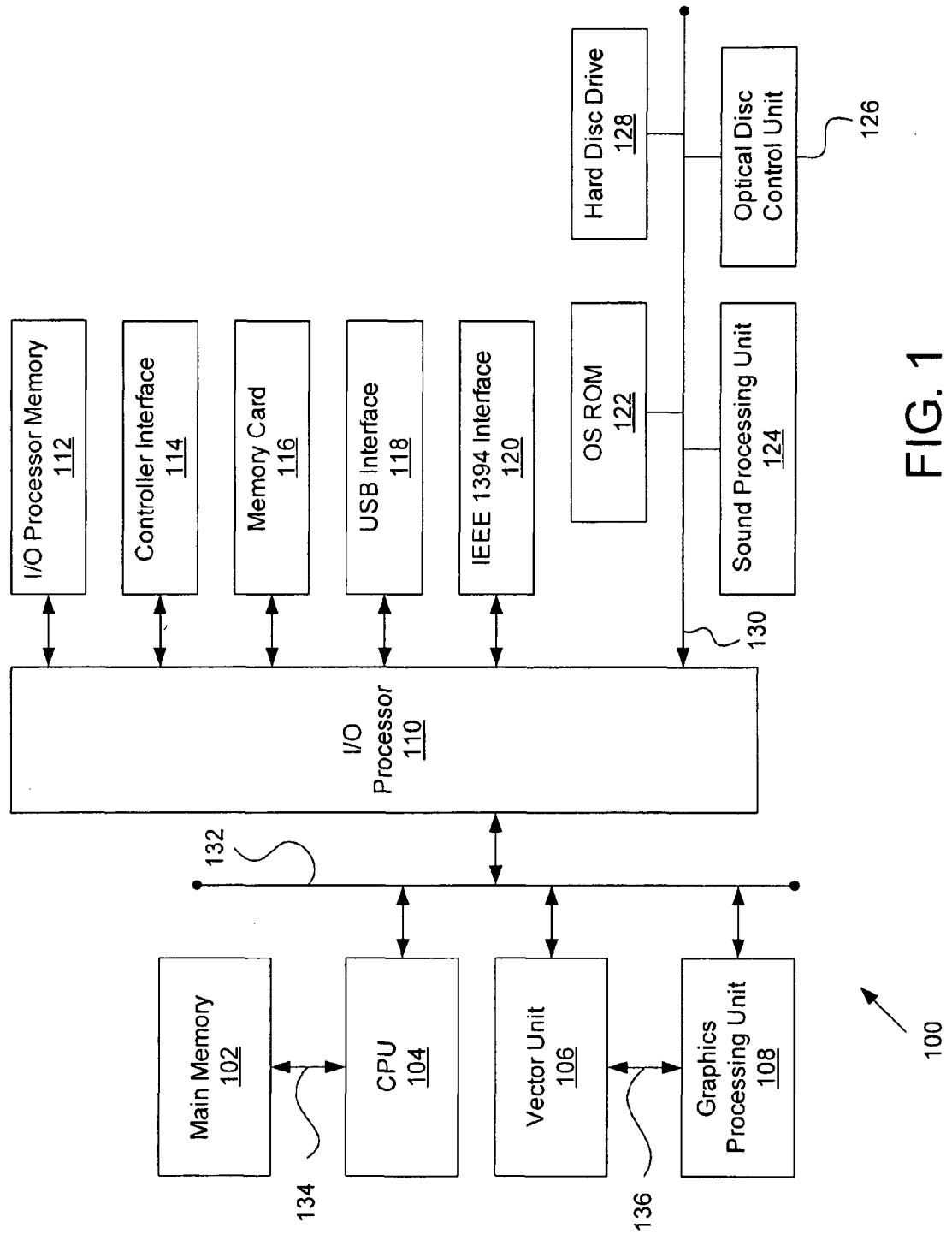
FIG. 1 is a block diagram of an exemplary electronic entertainment system, according to the present invention.

FIG. 1 is a block diagram of an exemplary electronic entertainment system 100 according to the present invention. The entertainment system 100 includes a main memory 102, a central processing unit (CPU) 104, at least one vector unit 106, a graphics processing unit 108, an input/output (I/O) processor 110, an I/O processor memory 112, a controller interface 114, a memory card 116, a Universal Serial Bus (USB) interface 118, and an IEEE 1394 interface 120, although other bus standards and interfaces may be utilized. The entertainment system 100 further includes an operating system read-only memory (OS ROM) 122, a sound processing unit 124, an optical disc control unit 126, and a hard disc drive 128, which are connected via a bus 130 to the I/O processor 110. Preferably, the entertainment system 100 is an electronic gaming console. Alternatively, the entertainment system 100 may be implemented as a general-purpose computer, a set-top box, or a hand-held gaming device. Further, similar entertainment systems may contain more or less operating components.

The CPU 104, the vector unit 106, the graphics processing unit 108, and the I/O processor 110 communicate via a system bus 132. Further, the CPU 104 communicates with the main memory 102 via a dedicated bus 134, while the vector unit 106 and the graphics processing unit 108 may communicate through a dedicated bus 136. The CPU 104 executes programs stored in the OS ROM 122 and the main memory 102. The main memory 102 may contain prestored programs and programs transferred through the I/O Processor 110 from a CD-ROM, DVD-ROM, or other optical disc (not shown) using the optical disc control unit 126. The I/O processor 110 primarily controls data exchanges between the various devices of the entertainment system 100 including the CPU 104, the vector unit 106, the graphics processing unit 108, and the controller interface 114.

The graphics processing unit 108 executes graphics instructions received from the CPU 104 and the vector unit 106 to produce images for display on a display device (not shown). For example, the vector unit 106 may transform objects from three-dimensional coordinates to two-dimensional coordinates, and send the two-dimensional coordinates to the graphics processing unit 108. Furthermore, the sound processing unit 124 executes instructions to produce sound signals that are outputted to an audio device such as speakers (not shown).

A user of the entertainment system 100 provides instructions via the controller interface 114 to the CPU 104. For example, the user may instruct the CPU 104 to store certain game information on the memory card 116 or instruct a character in a game to perform some specified action. Other devices may be connected to the entertainment system 100 via the USB interface 118 and the IEEE 1394 interface 120.

Figure 2:
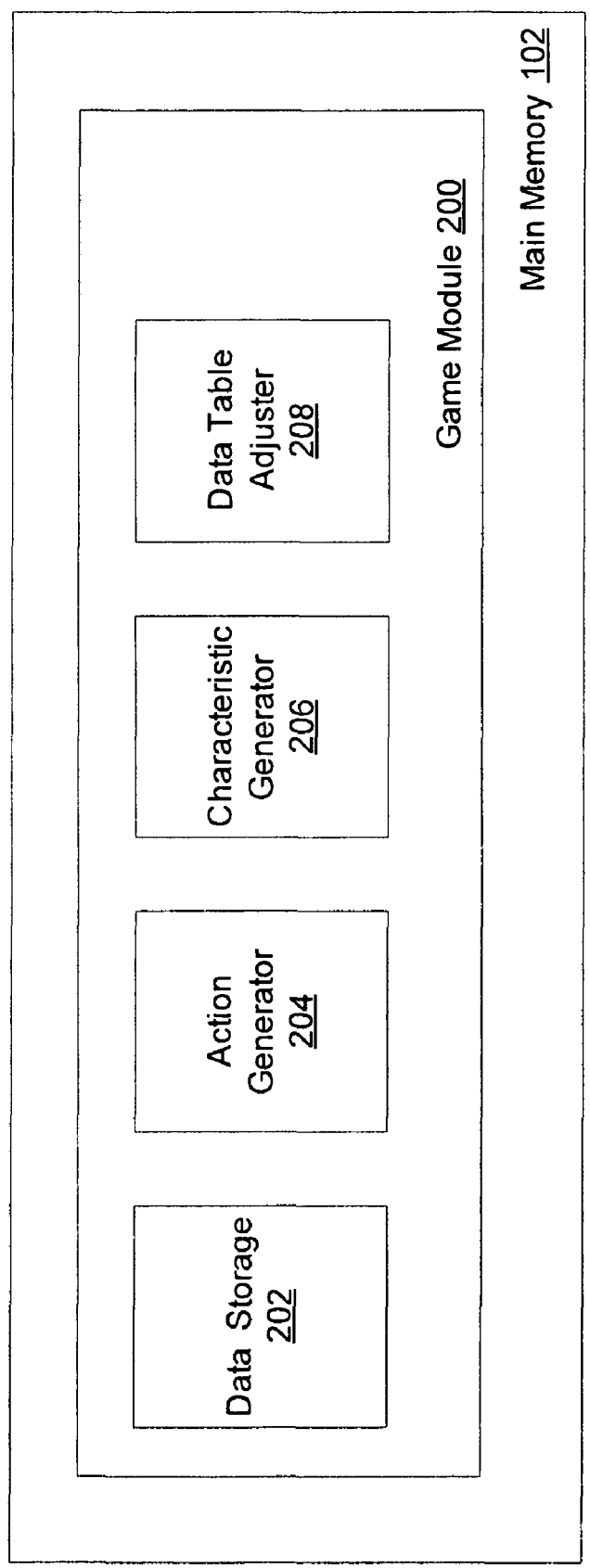
FIG. 2 is a block diagram of one embodiment of the main memory of FIG. 1, according to the present invention.

FIG. 2 is a block diagram of one embodiment of the main memory 102 of FIG. 1 according to the present invention. The main memory 102 is shown containing a game module 200 which is loaded into the main memory 102 from an optical disc in the optical disc control unit 126 (FIG. 1). The game module 200 contains instructions executable by the CPU 104, the vector unit 106, and the sound processing unit 124 of FIG. 1 that allows a user of the entertainment system 100 (FIG. 1) to play a game. In the exemplary embodiment of FIG. 2, the game module 200 includes data storage 202, an action generator 204, a characteristic generator 206, and a data table adjuster 208.

In one embodiment, the action generator 204, the characteristic generator 206, and the data table adjuster 208 are software modules executable by the CPU 104. For example, the action generator 204 is executable by the CPU 104 to produce game play, including character motion and character response; the characteristic generator 206 is executable by the CPU 104 to generate a character's expressions as displayed on a monitor (not shown); and the data table adjuster 208 is executable by the CPU 104 to update data in data storage 202 during game play. In addition, the CPU 104 accesses data in data storage 202 as instructed by the action generator 204, the characteristic generator 206, and the data table adjuster 208.

For the purposes of this exemplary embodiment, the game module 200 is a tribal simulation game in which a player creates and trains tribes of characters. A tribe of characters is preferably a group (or team) of characters associated with a given game user. Preferably, the tribal simulation game includes a plurality of character species, and each team of characters may include any combination of characters from any of the character species. A character reacts to other characters and game situations based upon the character's genetic makeup as expressed by gene attributes. Typically, each character's behavior depends upon one or more gene attributes. Gene attributes that typically remain constant throughout a character's life are called static attributes; gene attributes that may change during game play in response to character-character, character-group, and character-environment interactions are called dynamic attributes; and gene attributes that are functions of the static and dynamic attributes are called meta attributes. A character's dynamic and meta attributes may be modified by emotional attributes as quantified by hate/love (H/L) values. A character's H/L values correspond to other species, teams, and characters. A character's static attributes, dynamic attributes, meta attributes, and H/L values are described further below in conjunction with FIGS. 3-7.

Figure 3A:
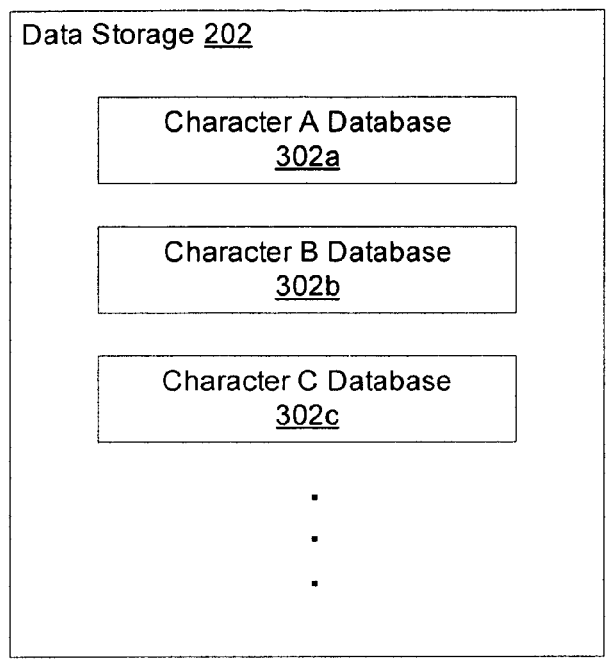
FIG. 3A is a block diagram of an exemplary embodiment of data storage of FIG. 2, according to the present invention.

FIG. 3A is a block diagram of an exemplary embodiment of the data storage 202 of FIG. 2 according to the present invention. The data storage 202 includes a character A database 302a, a character B database 302b, and a character C database 302c. Although the FIG. 3A embodiment of data storage 202 shows three character databases 302a, 302b, and 302c, the scope of the present invention includes any number of character databases 302.

Figure 3B:
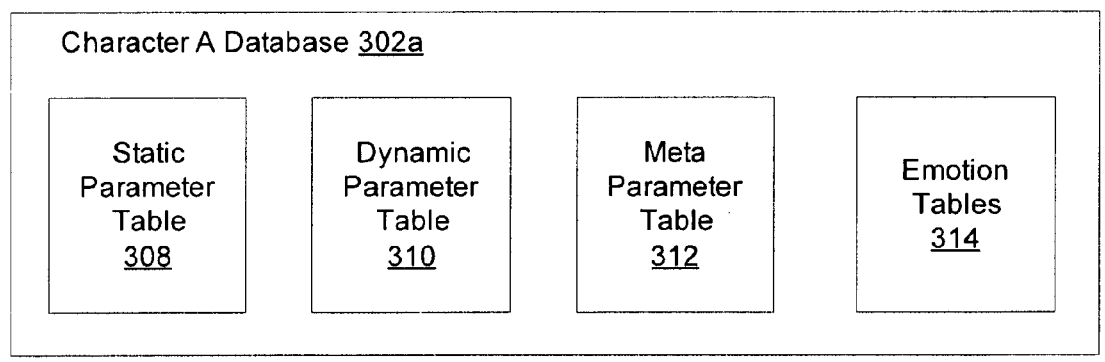
FIG. 3B is a block diagram of an exemplary embodiment of the character A data storage module of FIG. 3A, according to the present invention.

FIG. 3B is a block diagram of an exemplary embodiment of the character A database 302a of FIG. 3A. The character A database 302a includes a static parameter table 308, a dynamic parameter table 310, a meta parameter table 312, and emotion tables 314. Character A's static attributes are stored in the static parameter table 308, character A's dynamic attributes (preferably not including H/L values) are stored in the dynamic parameter table 310, character A's meta attributes are stored in the meta parameter table 312, and character A's H/L values are stored in the emotion tables 314.

Attributes are also referred to as parameters. Although the static attributes stored in the static parameter table 308 typically remain constant throughout character A's life, in an alternate embodiment of the invention, the static attributes may be changed through character training. Referring back to FIG. 3A, the character B database 302b and the character C database 302c are similar to the character A database 302a.

FIG. 4 is an illustration of an exemplary embodiment of the static parameter table 308 of FIG. 3B. The static parameter table 308 includes a plurality of static parameters, such as, but not limited to, a strength parameter 402, a speed parameter 404, a sight parameter 406, a hearing parameter 408, a maximum hit point parameter 410, a hunger point parameter 412, a healing urge parameter 414, a self-healing rate parameter 416, and an aggressive base parameter 418. The scope of the invention may include other static parameters as well. The strength parameter 402 corresponds to a character's strength; the speed parameter 404 corresponds to how fast a character walks and runs across terrain; the sight parameter 406 corresponds to a character's viewing distance; and the hearing parameter 408 corresponds to a character's hearing distance. The maximum hit point parameter 410 is, preferably, a health parameter threshold value, which is discussed further below in conjunction with FIG. 5. The hunger point parameter 412 is a reference value to which a character's energy is measured to compute a character's hunger parameter, as will be described further below in conjunction with FIG. 6. Further, the healing urge parameter 414 corresponds to a character's desire to heal another character, while the self-healing rate parameter 416 corresponds to a time rate at which a character heals itself. Finally, the aggressive base parameter 418 is a reference value that represents a character's base aggression level, and is described further below in conjunction with FIG. 6. As previously indicated, not all of these parameters are required, and other parameters may be contemplated for use in the present invention.

FIG. 5 is an illustration of an exemplary embodiment of the dynamic parameter table 310 of FIG. 3B. The dynamic parameter table 310 includes a plurality of dynamic parameters, such as an energy parameter 502, a health parameter 504, an irritation parameter 506, and a game experience parameter 508. However, the scope of the present invention may not include all of the above listed parameters and/or include other dynamic parameters. These dynamic parameters change during game play. For example, the character's energy parameter 502 is a function of the character's consumption of food and the rate at which the character uses energy. When the character eats, the character's energy parameter 502 increases. However, the character is continuously using energy as defined by the character's metabolic rate. The metabolic rate is a meta parameter dependant upon several static parameters and is further discussed below in conjunction with FIG. 6.

In the present embodiment, the health parameter 504 is less than or equal to the maximum hit point parameter 410 (FIG. 4), and is a function of the character's energy parameter 502, the character's self-healing rate parameter 416 (FIG. 4), and a number of character hits. For example, a character is assigned a health parameter 504 equal to the maximum hit point parameter 410 upon game initialization. Each time the character is hit by another character via a physical blow or weapons fire, the character's health parameter 504 decreases. In addition, whenever a character's energy parameter 502 falls below a predefined threshold value, the character's health parameter 504 decreases. Furthermore, the character's health parameter 504 increases at the character's self-healing rate 416. Thus, although static and dynamic parameters are stored in separate tables, these parameters are closely related. For example, the health parameter 504 is based in part on the self-healing rate parameter 416, which is a static parameter.

Preferably, the character's irritation parameter 506 increases if the character is exposed to irritating stimuli, such as the presence of enemies or weapons fire within the character's range of sight, specified by the sight parameter 406 (FIG. 4). The irritation parameter 506 decreases over time at a predefined rate.

Finally, the character's game experience parameter 508 quantifies a character's game experiences, particularly in association with character participation in tribal games and fighting. For example, an experienced character has accumulated wisdom, and is less likely to be surprised by game situations and more adept at making game decisions.

FIG. 6 is an illustration of an exemplary embodiment of the meta parameter table 312 of FIG. 3B. The meta parameter table 312 includes a plurality of meta parameters, such as, but not necessarily completely inclusive of or limited to, a hunger parameter 602, a metabolic rate parameter 604, an aggression parameter 606, and a fight/flight parameter 608. The meta parameters are typically changeable, and are based upon the static and dynamic parameters. For example, a character's desire to eat is dependent upon the hunger parameter 602. In one embodiment of the invention, the hunger parameter 602 is a signed value defined by the energy parameter 502 (FIG. 5) less the hunger point parameter 412 (FIG. 4). If the character's hunger parameter 602 is greater than zero, then the character is not hungry. However, if the character's hunger parameter 602 is less than zero, then the character is hungry. As the negative hunger parameter 602 decreases (i.e., becomes more negative), the character's desire to eat increases. This desire to eat may then be balanced with other desires, such as a desire to attack an enemy or to search for a weapons cache. The weighting of these parameters may determine a character's behaviors and actions.

Typically, the metabolic rate parameter 604 is directly proportional to the character's speed parameter 404 (FIG. 4), the strength parameter 402 (FIG. 4), and the maximum hit point parameter 410 (FIG. 4), while indirectly proportional to the character's hunger point parameter 412 (FIG. 4) and healing urge parameter 414 (FIG. 4). For example, if the character's healing urge parameter 414 is large, the character is likely a calm, non-excitable individual. Therefore the character's metabolic rate parameter 604 would be small. Alternatively, if the character's healing urge parameter 414 is small, the character is likely a highly-strung, excitable individual. Consequently, the character's metabolic rate parameter 604 would be large.

Finally, the aggression parameter 606 is defined as the aggressive base parameter 418 (FIG. 4) plus the irritation parameter 506 (FIG. 5). As the aggression parameter 606 increases, the character becomes more aggressive and is more likely to be engaged in fights.

A character uses the fight/flight parameter 608 to determine whether, when faced with an enemy or other dangerous situations, to fight or flee the enemy. The fight/flight parameter 608 is preferably based upon the hunger parameter 602, the aggression parameter 606, the game experience parameter 508 (FIG. 5), and the energy parameter 502 (FIG. 5). In one embodiment of the invention, a large value for the fight/flight parameter 608 corresponds to a character's desire to fight, whereas a small value for the fight/flight parameter 608 corresponds to a character's desire to flee. For example, as the character's hunger or aggression increases, as measured by the character's hunger parameter 602 and aggression parameter 606, respectively, the character is more likely to engage in fights.

FIG. 7 is an illustration of one embodiment of the emotion tables 314 of FIG. 3B, according to the present invention. The emotion tables 314 include an individual's hate/love (H/L) table 702, a species H/L table 704, and a team H/L table 706. The individual's H/L table 702 includes one or more character identification (ID) numbers and one or more character H/L values, wherein each character ID number is associated with a character H/L value. For example, character A has a −900 character H/L value corresponding to a character identified by character ID number 192993293. Thus, character A has high hate for the individual having character ID number 192993293. Conversely, character A has a 100 character H/L value for character ID number 339399928. This positive H/L value corresponds to a general liking of the individual having ID number 339399928. The more negative or positive the H/L value is, the more the particular individual is hated or loved, respectively. In a further embodiment, the individuals H/L table 702 may also include individual character names corresponding to the character ID numbers.

The species H/L table 704 includes one or more species names and one or more species H/L values. Each species name is associated with a species H/L value which represents character A's relationship with each species. Similar to the individuals H/L table 702, the more negative or positive the H/L value, the more the particular species is hated or loved, respectively. For example, character A has a 100 species H/L value corresponding to the Nids species which implies a general like of the Nids species. Conversely, character A has a −500 species H/L value corresponding to the Antenids species. Therefore, character A has a strong dislike (i.e., hate) for the Antenids species.

Similarly, the team H/L table 706 includes one or more team ID numbers, one or more team H/L values, and one or more team names. Each team ID number is associated with a team H/L value and a team name. For example, the character A has a 1000 team H/L value corresponding to the Frosties team represented by ID number 139000. Because the H/L value is so high, character A has a deep love for the Frosties team. However, character A has a −500 H/L value corresponding to the Slashers team represented by ID number 939992, thereby representing a hate for this team.

In one embodiment of the invention, the character, species, and team H/L values range from −1000 to 1000. A character, species, or team H/L value of 1000 represents unconditional love directed towards the character, species, or team, respectively, while a character, species, or team H/L value of −1000 represents extreme hatred directed towards the character, species, or team, respectively. A H/L value of zero represents a neutral feeling. In alternate embodiments, the H/L value ranges may be larger or smaller, and may include other maximum and minimum values.

According to one embodiment of the present invention, the data table adjuster 208 (FIG. 2) initializes all character and team H/L values to zero upon initiation of a new game. Furthermore, the data table adjuster 208 initializes all species H/L values to zero or to non-zero predefined values dependent upon game-defined species compatibility. In an alternate embodiment, the data table adjuster 208 initializes all species, character, and team H/L values to zero upon initiation of a new game. In a further embodiment, the data table adjuster 208 initializes some or all character, species, and team H/L values to non-zero predefined values dependent upon game-defined character, species, and team compatibility. Upon game completion, a user may save all the H/L values to the memory card 116 (FIG. 1) or the hard disc drive 128 (FIG. 1) for future game play. If the user has instructed the game module 200 (FIG. 2) to save the H/L values, the data table adjuster 208 may use the saved H/L values to initialize all game H/L values upon continuation of game play.

Figure 8:
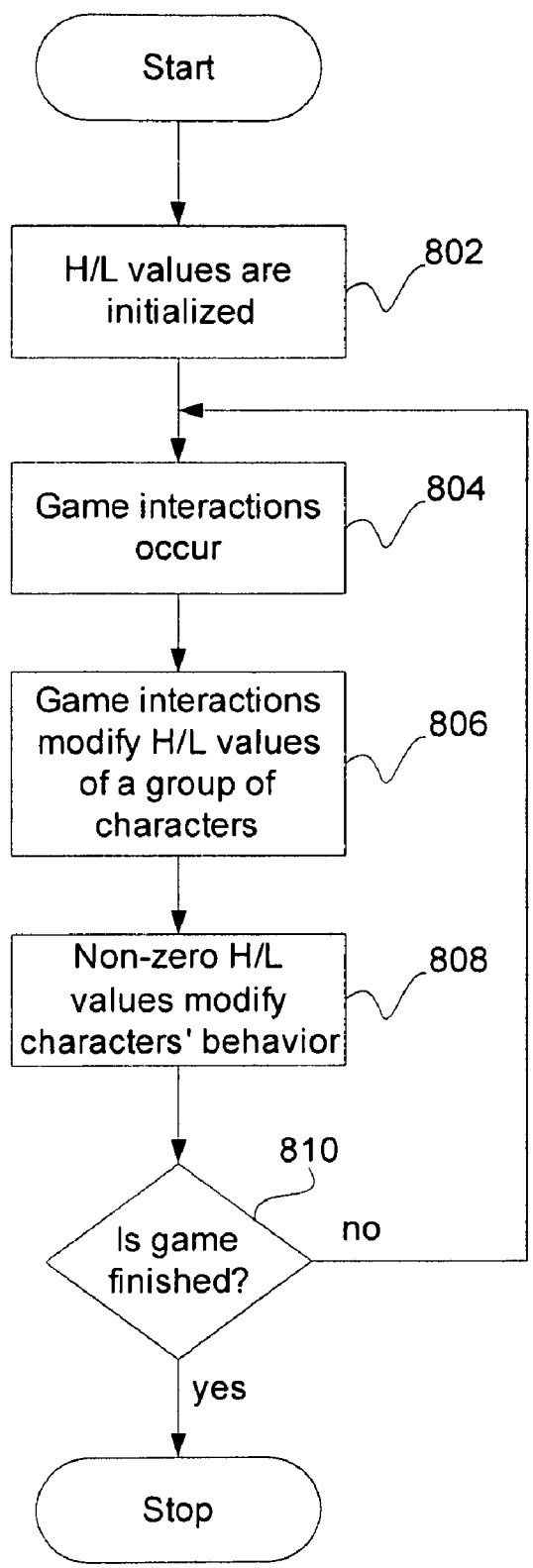
FIG. 8 is a flowchart of method steps for dynamic behavioral modification based upon game interactions, according to one embodiment of the present invention.

FIG. 8 is an exemplary flowchart 800 of method steps for dynamic behavioral modification based upon game interactions, according to one embodiment of the present invention. In step 802, H/L values are initialized. Initially, a user (not shown) instructs the game entertainment system 100 (FIG. 1) to execute the game module 200 (FIG. 2) via user commands and the controller interface 114 (FIG. 1). The CPU 104 (FIG. 1) receives the user commands and executes the data table adjuster 208 (FIG. 2). The data table adjuster 208 accesses the character, species, and team H/L values and stores the character, species, and team H/L values in the emotions table 314 (FIG. 3). These species H/L values are set to predefined values dependent upon game-defined species compatibility or results of a previous playing of the game. In an initial game play, since characters and teams have not yet interacted via game play, the data table adjuster 208, preferably, initializes all character and team H/L values to zero, where a H/L value of zero represents a neutral emotion.

Next in step 804, the CPU 104 executes the action generator 204 (FIG. 2) and the characteristic generator 206 (FIG. 2) to generate game play and game interactions. Game interactions typically include information exchange between characters, as well as communication, observation, detection of sound, direct physical contact, and indirect physical contact. For example, in one embodiment of the invention, character A and character B may interact and exchange information via a conversation. In another embodiment of the invention, character A may receive information via observations. For instance, character A may observe character B engaged in direct physical contact with character C via a first fight, or character A may observe character B engage character C in indirect physical contact via an exchange of weapons fire. Alternatively, in another example, character A may observe character B interact with an "inanimate" object. For example, character B moves a rock and discovers a weapons cache. In a further embodiment of the invention, character A may hear a communication between character B and character C. In yet another embodiment of the invention, character A may engage in direct physical contact with character B. Finally, in another embodiment of the invention, character A may engage in indirect physical contact with character B. For example, character A may discharge a weapon aimed at character B, or character A may receive fire from character B's weapon. The above described game interactions are meant as exemplary interactions, however, the scope of the present invention covers all types of interactions.

In step 806, the data table adjuster 208 modifies the character, species, and team H/L values based upon the game interaction. In a first example, referring to FIG. 7, character A has a −200 character H/L value corresponding to character B and a 750 character H/L value corresponding to character C. If character B communicates to character A that character B has healed character C, then the data table adjuster 208 adjusts character A and character B's character H/L values. For example, after the communication with character B, character A's character H/L value corresponding to character B may increase to −75. In other words, character A hates character B less than before the communication, since character B has healed a character strongly loved by character A, namely character C. Further, character A and character B may communicate to other characters of the group that character B has healed character C. Consequently, other characters' H/L values corresponding to character B are adjusted to reflect a new feeling towards character B. In this manner of group interaction, the average behavior of the group has been modified.

In a second example, character A initially has a 800 character H/L value corresponding to character B and a −50 character H/L value corresponding to character C. However, character A sees character C hit character B, and thus character A's character H/L values are adjusted accordingly. In this example, character A's character H/L value corresponding to character B increases to 850 because of feelings of sympathy towards character B, and character A's character H/L value corresponding to character C may decrease to −200 due to an increased hatred for character C. In addition, if character C then attacks character A, character A develops more hatred towards character C, and character A's character H/L value corresponding to character C may further decrease to −275. However, at some later time in the game, if character C communicates to character A useful information on the operation of a weapon, then character A's character H/L value corresponding to character C may increase to −150.

In one embodiment of the invention, characters' H/L values may be adjusted based upon an averaging procedure. For example, if a group of characters interact, then the characters' H/L values are adjusted based upon averaging the group of characters' H/L values. More specifically, if three characters have a Nids species (FIG. 7) interaction, and if character A has a 100 Nids species H/L value (FIG. 7), character B has a −1000 Nids species H/L value, and character C has a 300 Nids species H/L value, then after the interaction each character (character A, character B, character C) has a −200 Nids species H/L value. The adjustment of characters' H/L values based upon the averaging procedure is an exemplary embodiment of the invention and is not meant to restrict the invention. In alternate embodiments, characters' H/L values may be adjusted based on other weighting methods or mathematical algorithms.

In step 808, each character's non-zero character, species, and team H/L values modify the character's subsequent behavior. For example, character A's energy parameter 502 (FIG. 5) is less than character A's hunger point parameter 412 (FIG. 4), and consequently character A is hungry. Subsequently, character A sees an enemy character, for example, character B. Character A must choose between attacking character B or searching for food. Referring back to the first example of step 806, since character A's character H/L value corresponding to character B has been previously modified from −200 to −75, character A chooses to search for food instead of attacking character B. However, if character A's character H/L value corresponding to character B had not been modified from −200 to −75 in step 806, then character A's hatred for character B outweighs character A's desire to search for food, and character A attacks character B. Thus, modifications to character A's character, species, and team H/L values via game interactions modify character A's subsequent behavior and game decisions. Similarly, as game interactions modify H/L values of a group of characters (step 806), the subsequent average behavior of the group is modified.

In step 810, the CPU 104 determines if the game user(s) have completed the game. If the CPU 104 determines that the game is complete, then the method ends. However if in step 810, the CPU 104 determines that the game is not complete, then the method continues at step 804.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for emotion-based game character manipulation, the method comprising:
 executing instructions stored in memory, wherein execution of the instructions by a processor:
  maintains a table of quantified attributes for a first game character, the attributes including emotional attributes and non-emotional attributes;
  determines an adjustment to an emotional attribute of the first game character based on an interaction between the first game character and a second game character;
  adjusts the emotional attribute of the first game character as determined, wherein adjustment of the emotional attribute results in an adjustment to a non-emotional attribute of the first game character; and
  generates a behavior of the first game character based on the adjusted non-emotional attribute.

2. The method of claim 1, wherein the emotional attributes of the first game character is associated with a team of game characters.

3. The method of claim 1, wherein the emotional attributes of the first game character is associated with a species of game characters.

4. The method of claim 3, wherein the emotional attributes of the first game character associated with the species is further based on a species of the first game character.

5. The method of claim 1, further comprising the execution of instructions by a processor to receive user input concerning the interaction between the first game character and the second game character and initiating the interaction based on the received user input.

6. The method of claim 1, further comprising the execution of instructions by a processor to re-adjust the emotional attribute of the first game character back to an original state after a period of time.

7. The method of claim 1, wherein determining an adjustment to an emotional attribute of the first game character is further based on the second game character being within range-of-sight of the first game character.

8. The method of claim 1, wherein determining an adjustment to the emotional attribute of the first game character is further based on an emotional attribute of the second game character.

9. The method of claim 7, wherein the emotional attribute of the first game character is adjusted to be closer to the emotional attribute of the second game character.

10. The method of claim 1, wherein generating the behavior of the first game character includes determining that the first game character chooses an action from at least two possible actions.

11. The method of claim 1, wherein generating the behavior of the first game character includes determining that the first game character mimic an action performed by the second character.

12. A system for emotion-based game character manipulation, the system comprising:
 a memory that stores a data table concerning quantified attributes for a first game character, the attributes including emotional attributes and non-emotional attributes;
 a processor, wherein execution of instructions by the processor determines an adjustment to a stored emotional attribute of the first game character based on an interaction between the first game character and a second game character;

a data table adjuster stored in memory and executable to adjust the stored emotional attribute of the first game character as determined by execution of the instructions by the processor, wherein adjustment of the stored emotional attribute results in an adjustment to a non-emotional attribute of the first game character; and an action generator stored in memory and executable to generate a behavior of the first game character based on the adjusted non-emotional attribute.

13. The system of claim 12, wherein the memory further stores data concerning emotional attributes associated with a team of game characters.

14. The system of claim 12, wherein the memory further stores data concerning emotional attributes associated with a species of game characters.

15. The system of claim 12, wherein the action generator is further executable to initiate the interaction between the first game character and the second game character based on received user input.

16. The system of claim 12, wherein execution of instructions by the processor further determines the adjustment to the emotional attribute of the first game character based on the second game character being within range-of-sight of the first game character.

17. The system of claim 12, wherein execution of instructions by the processor further determines the adjustment to the emotional attribute of the first game character based on an emotional attribute of the second game character.

18. The system of claim 12, wherein the action generator is further executable to direct the first game character to choose an action from at least two possible actions.

19. The system of claim 12, wherein the action generator is further executable to direct the first game character to mimic an action performed by the second character.

20. A non-transitory computer-readable storage medium having embodied thereon a program, the program being executable by a processor to perform a method for emotion-based game character manipulation, the method comprising:

maintaining a table of quantified attributes for a first game character, the attributes including emotional attributes and non-emotional attributes;

determining an adjustment to an emotional attribute of the first game character based on an interaction between the first game character and a second game character;

adjusting the emotional attribute of the first game character as determined, wherein adjustment of the emotional attribute results in an adjustment to a non-emotional attribute of the first game character; and generating a behavior of the first game character based on the adjusted non-emotional attribute.

* * * * *